Oct. 18, 1955  T. B. MORGAN, JR  2,721,008
DISPENSING DEVICE
Filed Feb. 2, 1953
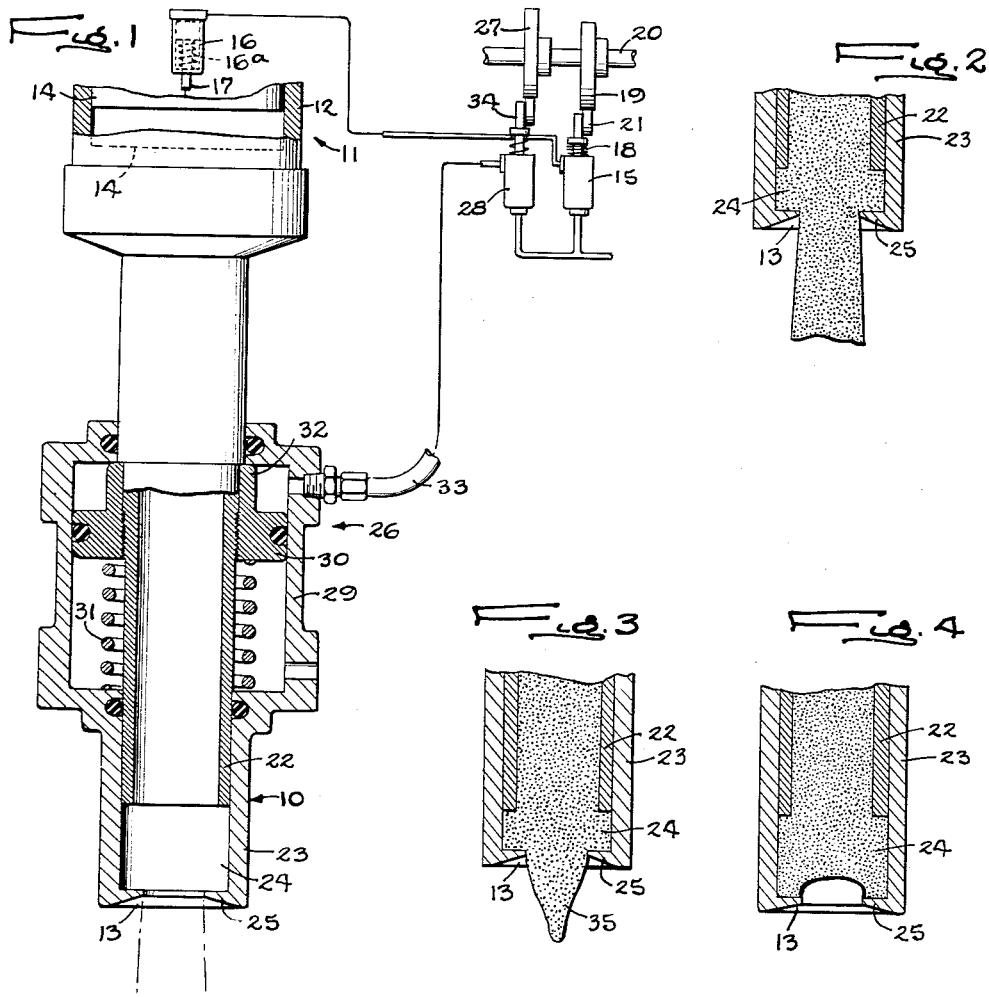
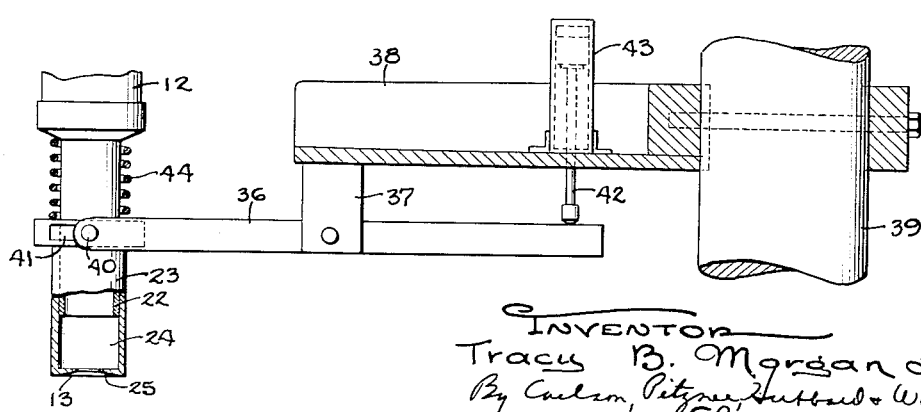
INVENTOR
Tracy B. Morgan Jr.
By Carlson, Pitzner, Hubbard & Wolfe
ATTORNEYS

United States Patent Office 2,721,008
Patented Oct. 18, 1955

2,721,008

DISPENSING DEVICE

Tracy B. Morgan, Jr., Rockford, Ill., assignor to Bartelt Engineering Company, Rockford, Ill., a corporation of Illinois Application February 2, 1953, Serial No. 334,423

3 Claims. (Cl. 222—334)

This invention relates to a dispensing device in which fluid is discharged through a spout and when the flow of fluid is stopped, a vacuum is created in the outlet portion of the spout to prevent the fluid from dripping. More particularly, the invention relates to a device for dispensing semi-solid or viscous materials, such as frozen fruit juices, which flow rather slowly.

The principal object is to provide a new and improved dispensing device of the above character in which the vacuum is created by a positive action so as to prevent dripping regardless of the rate of flow of the fluid.

Another object is to make the spout in two parts which form a chamber at the outlet of the spout and which are moved relatively after the flow of fluid is stopped first to contract the chamber and discharge the fluid therein and then to expand the chamber thus creating the vacuum.

A more detailed object is to form the chamber by a tube and a sleeve sliding on and extending beyond the outlet end of the tube so that the chamber is expanded and contracted by sliding the sleeve back and forth on the tube.

Other objects and advantages of the invention will become apparent from the following detailed description taken in connection with the accompanying drawings, in which Figure 1 is a fragmentary side view with parts broken away of a dispensing device employing the novel features of the present invention.

Figs. 2, 3 and 4 are fragmentary sectional views of the spout illustrating the manner in which the vacuum is created.

Fig. 5 is a fragmentary view of a modified form of the invention.

For the purpose of illustration, the invention is shown in the drawings embodied in a dispensing device comprising an elongated upright spout 10 through which a fluid, such as a frozen fruit juice, is discharged. The juice is stored in a suitable hopper (not shown) and is delivered to the spout intermittently in predetermined quantities by a feeding device 11. In the present instance, the latter is a conventional plunger type feeding device in which the juice in a cylinder 12 connecting the hopper and the spout is forced out through the outlet end 13 of the spout on the downward stroke of a plunger 14 sliding in the cylinder.

To actuate the plunger 14, operating fluid such as compressed air from a suitable source (not shown) is admitted through a valve 15 to a piston type air motor 16 which is connected to the rod 17 of the plunger and reciprocates the plunger in the cylinder 12. The valve 15 is biased to the closed position by a spring 18 and is opened by a cam 19 which is mounted on a rotating shaft 20 and engages the valve actuator 21. Thus, when a rise on the cam 19 engages the actuator 21, the valve 15 is opened to admit compressed air to the motor 16 to move the plunger 14 downwardly to the position shown in broken lines in Fig. 1 and force juice out through the spout 10. As a fall on the cam contacts the actuator, the spring 18 closes the valve exhausting the motor and permitting a compression spring 16a to retract the piston of the motor thus returning the plunger to its original position shown in full.

The present invention contemplates the provision of a novel means for creating a vacuum in the outlet end 13 of the spout 10 by a positive action after the flow of fluid through the spout has been stopped so that the fluid is prevented from dripping from the spout end. For this purpose, the spout 10 is made in two parts 22 and 23 which together form a chamber 24 at the outlet end 13 and which may be moved relatively to each other to change the size of the chamber. After the flow of fluid is discontinued, the chamber 24 is contracted by moving the parts 22 and 23 together thus discharging a portion of the fluid in the chamber and then the parts are moved apart expanding the chamber and creating a vacuum which holds the fluid up in the spout 10.

In the present instance, the part 22 is a stationary vertical tube fixed to and communicating with the plunger cylinder 12 and the part 23 is a sleeve sliding on the tube. The sleeve 23 extends beyond the lower end of the tube 22 and at its lower end is formed with an inturned flange 25. Thus the chamber 24 is defined by the lower end of the tube 22, the lower portion of the sleeve 23, and the flange 25.

Means is provided for moving the parts 22 and 23 relatively to each other and in timed relation to the actuation of the feeding device 11 to contract and then expand the chamber 24 after the flow of fluid has been stopped. Preferably, this means comprises a fluid motor 26 sliding the sleeve 23 back and forth on the tube 22 and energized in the proper sequence with the plunger 14 by a cam 27 mounted on the shaft 20 and actuating a valve 28 which is similar to the valve 15 and controls the admission of compressed air to the motor. The latter includes a movable cylinder 29 which is slidably mounted on the tube 22 and rigidly connected to the sleeve 23, and a stationary piston 30 disposed within the cylinder and threaded on the tube. Acting between the lower end of the cylinder 29 and the piston 30 is a compression spring 31 urging the cylinder down against a stop 32, herein an axial projection on the piston, so that normally the chamber 24 is expanded as shown in Fig. 1.

The compressed air is delivered to the motor 26 from the valve 28 through a line 33 and is admitted to the cylinder 29 above the piston 30. Thus, when the valve 28 is opened, the cylinder slides upwardly against the action of the spring 31 sliding the sleeve 23 up to the position shown in Fig. 2 and, when the valve is closed, the spring slides the cylinder and the sleeve back down to the lower limit position illustrated in Fig. 1. The cam 27 is shaped to move the actuator 34 of the valve 28 after the feed valve 15 has been closed and serves to open and then close the valve 28 before the next actuation of the valve 15.

In operation, the two valves 15 and 28 are closed and the parts are in the position shown in Fig. 1 as a container (not shown) is moved into place beneath the spout 10. When the container is in position, the rise on the cam 19 comes into engagement with the actuator 21 and opens the valve 15 to admit compressed air to the motor 16 which moves the plunger 14 down to the position shown in broken lines thus forcing the frozen juice down through the spout 10 and into the container. When the plunger reaches its lower position, the cam 19 permits the spring 18 to close the valve 15 so that the motor 16 is exhausted and raises the plunger to its upper position. At the same time, a rise on the cam 27 engages the actuator 34 to open the valve 28 and admit compressed air to the cylinder 29 which slides up on the tube 22. Thus the sleeve 23 is raised contracting the chamber 24 as shown in Fig. 2 and discharging a portion of the juice in the chamber.

When the sleeve 23 reaches its upper position, the flow of juice out of the spout stops leaving a portion 35 of the juice depending from the sleeve 23 as shown in Fig. 3. Before this depending portion begins to drip, a fall on the cam 27 comes into contact with the actuator 34 permitting the valve 28 to close and deenergize the motor 26 so that the spring 31 lowers the cylinder 29 and the sleeve 23 thus expanding the chamber 24. Such expansion creates a vacuum in the outlet end of the spout 10 and this vacuum draws the depending portion 35 back up into the chamber and holds the juice in the spout as shown in Fig. 4. Thus the vacuum prevents the juice from dripping while the filled container is removed and another empty container is moved into place below the spout.

Instead of sliding the sleeve 23 by the motor 26, the sleeve may be moved by a lever 36 as illustrated in Fig. 5. In this case, the lever is fulcrumed intermediate its ends on a depending arm 37 of an elongated horizontal bracket 38 bolted to a stationary post 39. A pin 40 on the outer end of the lever 36 projects into a horizontal slot 41 in the upper end of the sleeve 23 so that the latter slides up and down on the tube 22 as the lever is turned back and forth about its fulcrum. To turn the lever, a push rod 42 depending from an air motor 43, which is mounted on the bracket 38 and connected to the valve 28, pushes down on the lever adjacent its inner end. With this arrangement, the sleeve 23 is urged to its lower position by a spring 44 acting between the feed cylinder 12 and the outer end of the lever 36 and is raised when air is admitted to the motor 43 to slide the piston of the latter downwardly and tilt the lever clockwise as viewed in Fig. 5. The vacuum in the spout 10 is created by the same sequence of operation as in the form shown in Fig. 1, that is, after the feed valve 15 is closed, the valve 28 first is opened to energize the motor 43 and turn the lever 36, thereby sliding the sleeve 23 up, and then is closed to permit the spring 44 to slide the sleeve back down.

It will be observed that the vacuum in the spout 10 is caused by the positive action of expanding and contracting the chamber 24, that is, by sliding the sleeve 23 up and then down on the tube 22, and does not depend upon the rate of flow of the fluid being dispensed. Thus the device is effective to prevent dripping of the fluid from the spout between operations of the feeding plunger 14 when viscous or semi-solid materials such as frozen fruit juices are being dispensed.

I claim as my invention:

1. In a dispensing device, the combination of, a filling tube, a feeding device controlling the flow of material to said tube and operable to dispense a predetermined amount of material through the tube, a sleeve slidably mounted on said tube and projecting beyond the outer end thereof, said sleeve having an inturned flange partially closing its outer end to define a chamber between the outer ends of said tube and said sleeve, an actuator connected to said sleeve and operable to slide said sleeve back and forth on said tube thereby to contract and expand said chamber, and mechanism energizing said feeding device and said actuator in timed relation with each other first to dispense a quantity of material through said tube, then to contract said chamber and discharge material therein and finally to expand said chamber to create a vacuum in the same, said flange supporting the column of material in said tube when said chamber is expanded.

2. In a dispensing device, the combination of, a tube open at one end and adapted to be connected at the other end to a supply of material to be dispensed, a hollow member encircling said tube and projecting beyond the open end of the tube to cooperate with said tube to form a chamber adjacent said open end, said member having an inturned flange adjacent its outer end to define an opening generally alined with said tube, means supporting said member for movement relative to said tube, an actuator energized intermittently and operable to move said member back and forth relative to said tube to contract and to expand said chamber thereby respectively discharging material from and creating a vacuum in the chamber, and a feeding device controlling the flow of material through said spout and operable before said chamber is expanded to discharge a predetermined quantity of material through the tube, said flange being operable after expansion of said chamber to support the column of material in said tube.

3. In a dispensing device, the combination of, a filling spout partially closed at the outlet end thereof to form a chamber at the outer end of the spout, said spout including parts axially movable relative to each other to expand and contract said chamber, a feeding device controlling the flow of material to be dispensed to said spout and operable to deliver intermittently a predetermined quantity of material to the outlet end of the spout, and mechanism connected to said parts and operable after said feeding device has delivered a quantity of material to move said parts first to contract and then to expand said chamber thereby successively discharging the material from and creating a vacuum in the chamber.

References Cited in the file of this patent

UNITED STATES PATENTS

| | | |
|---|---|---|
| 2,150,760 | Cozzoli | Mar. 14, 1939 |
| 2,645,401 | Kerr | July 14, 1953 |